(12) United States Patent
Severns

(10) Patent No.: US 8,137,042 B2
(45) Date of Patent: Mar. 20, 2012

(54) FASTENER FOR SECURING FIRST AND SECOND COMPONENTS TOGETHER AND METHOD OF USING SAME

(75) Inventor: Gary Severns, Rochester, IN (US)

(73) Assignee: Altenloh, Brinck & Co. US, Inc., Bryan, OH (US)

( * ) Notice: Subject to any disclaimer, the term of this patent is extended or adjusted under 35 U.S.C. 154(b) by 346 days.

(21) Appl. No.: 11/729,107

(22) Filed: Mar. 28, 2007

(65) Prior Publication Data

US 2007/0183865 A1 Aug. 9, 2007

Related U.S. Application Data

(63) Continuation of application No. PCT/US05/35044, filed on Sep. 29, 2005.

(60) Provisional application No. 60/614,275, filed on Sep. 29, 2004.

(51) Int. Cl.
 *F16B 35/00* (2006.01)
(52) U.S. Cl. .......................... 411/387.1; 411/5
(58) Field of Classification Search .............. 411/2, 5, 411/386–387.8, 412, 413; 408/214
 See application file for complete search history.

(56) References Cited

U.S. PATENT DOCUMENTS

| | | | | |
|---|---|---|---|---|
| 11,280 | A * | 7/1854 | Snangler | 408/214 |
| 1,394,608 | A * | 10/1921 | Davern | 411/390 |
| 1,622,209 | A * | 3/1927 | Robinson | 408/214 |
| 2,993,950 | A * | 7/1961 | Forman | 174/138 D |
| 3,057,285 | A * | 10/1962 | Wheeler | 454/339 |
| 3,817,146 | A * | 6/1974 | Scott | 411/384 |
| 4,022,099 | A * | 5/1977 | Ballantyne | 411/383 |
| 4,480,951 | A * | 11/1984 | Regensburger | 408/224 |
| 4,645,396 | A * | 2/1987 | McCauley et al. | 411/387.2 |
| 4,740,121 | A * | 4/1988 | Arnold | 408/224 |
| 4,900,208 | A | 2/1990 | Kaiser et al. | |
| 4,920,833 | A * | 5/1990 | Rosenthal | 81/124.1 |
| 4,958,972 | A | 9/1990 | Shinjo | |
| 5,209,622 | A * | 5/1993 | Kazino et al. | 411/386 |
| 5,213,459 | A * | 5/1993 | Palm | 411/29 |
| 5,439,338 | A * | 8/1995 | Rosenberg | 411/400 |
| 5,499,896 | A * | 3/1996 | Cafarelli | 411/387.2 |
| 5,588,788 | A * | 12/1996 | Dominguez | 411/482 |
| 5,746,556 | A | 5/1998 | Sato | |
| 5,875,606 | A * | 3/1999 | Jensen | 52/741.41 |
| 5,899,123 | A | 5/1999 | Lukes | |
| 5,915,901 | A * | 6/1999 | Aasgaard | 411/29 |
| 6,062,786 | A * | 5/2000 | Garver et al. | 411/386 |
| 6,062,788 | A * | 5/2000 | Ying-Feng | 411/480 |
| 6,074,149 | A * | 6/2000 | Habermehl et al. | 411/442 |
| 6,102,913 | A * | 8/2000 | Jackson | 606/265 |
| 6,227,666 | B1 * | 5/2001 | Hirschman | 351/95 |
| 6,685,411 | B2 * | 2/2004 | Kato | 411/386 |

* cited by examiner

*Primary Examiner* — Flemming Saether

(74) *Attorney, Agent, or Firm* — MacMillan, Sobanski & Todd, LLC

(57) ABSTRACT

First and second components are connected together by a fastener that includes a head and a shank having a bolt portion and a drill portion. The fastener is initially rotated relative to the first and second components such that the drill portion drills a hole through the first and second components. Then, the drive portion of the fastener is removed from the bolt portion of the shank of the fastener, such as by using a removal tool. Lastly, a nut is installed on the bolt portion of the shank of the fastener.

17 Claims, 4 Drawing Sheets

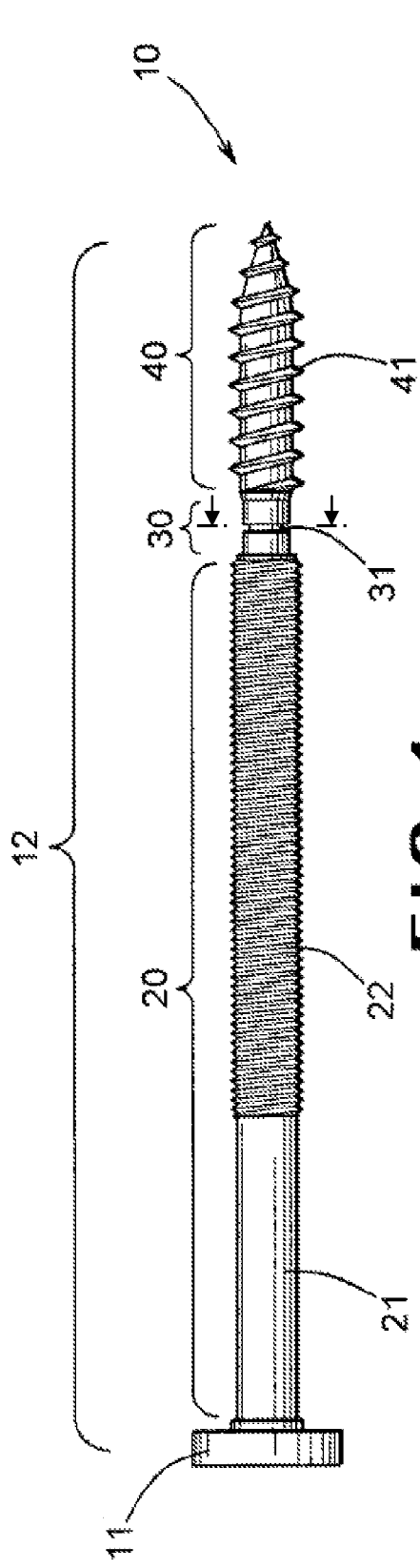
FIG. 1
FIG. 1A
FIG. 1B
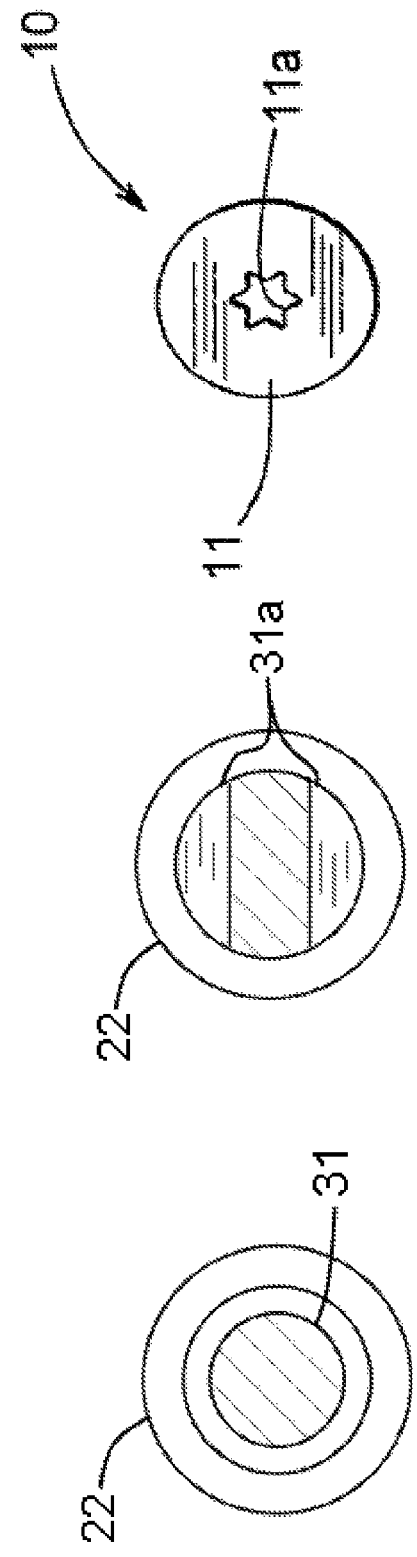
FIG. 2

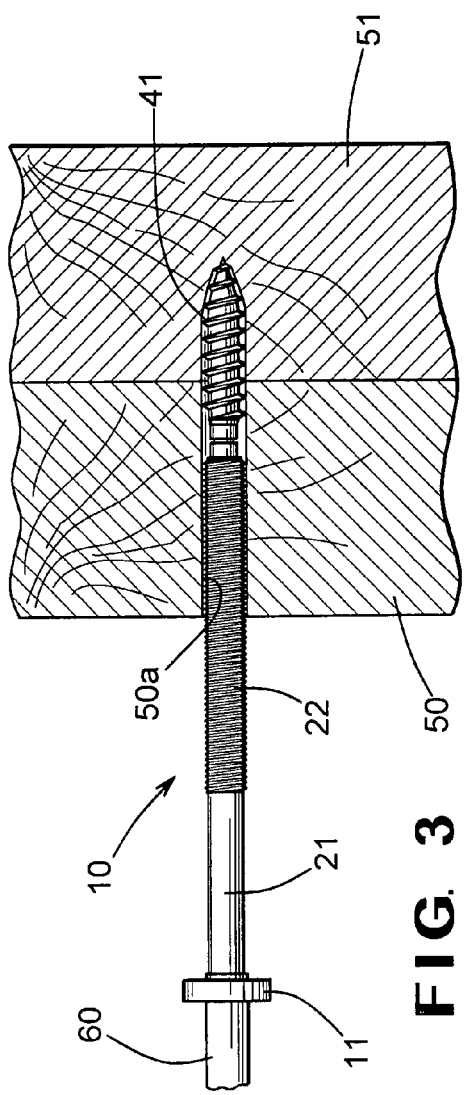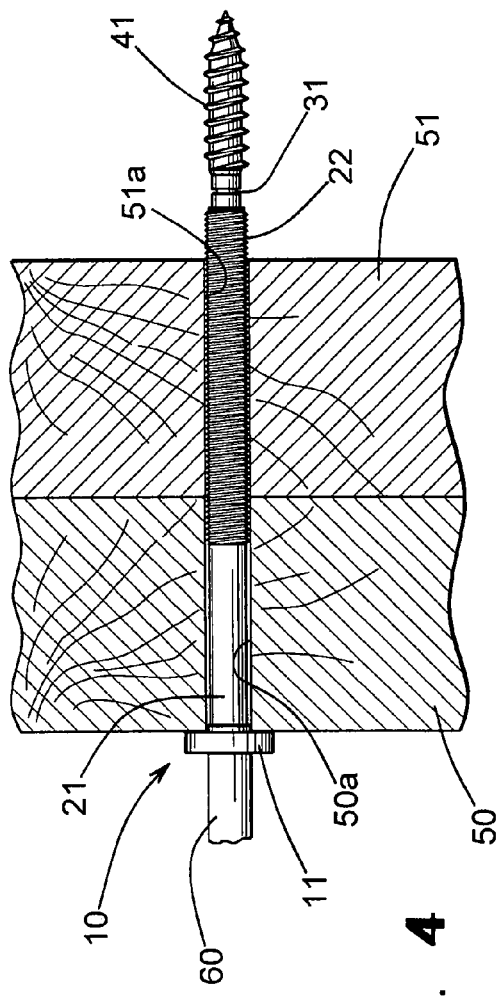

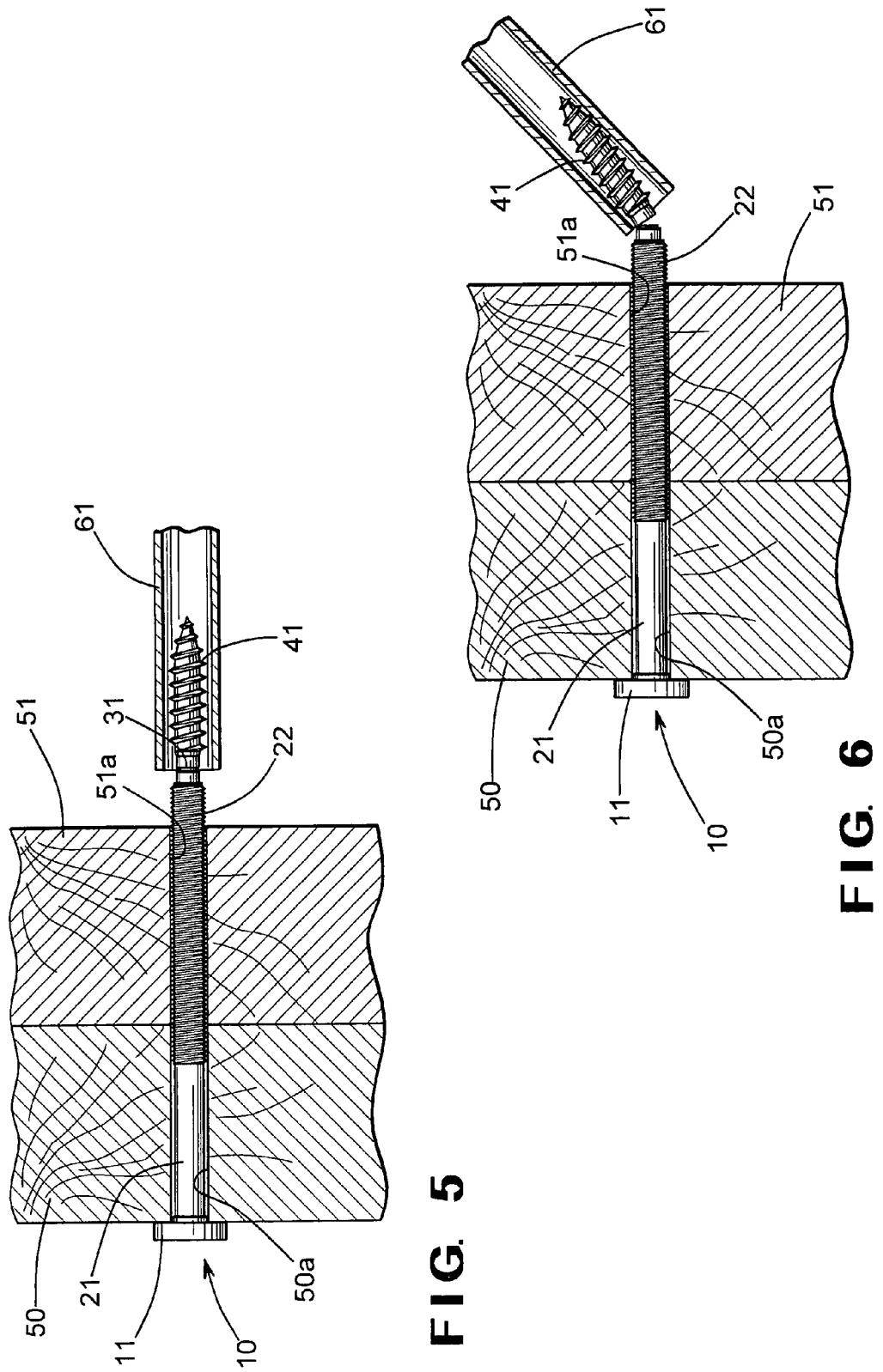

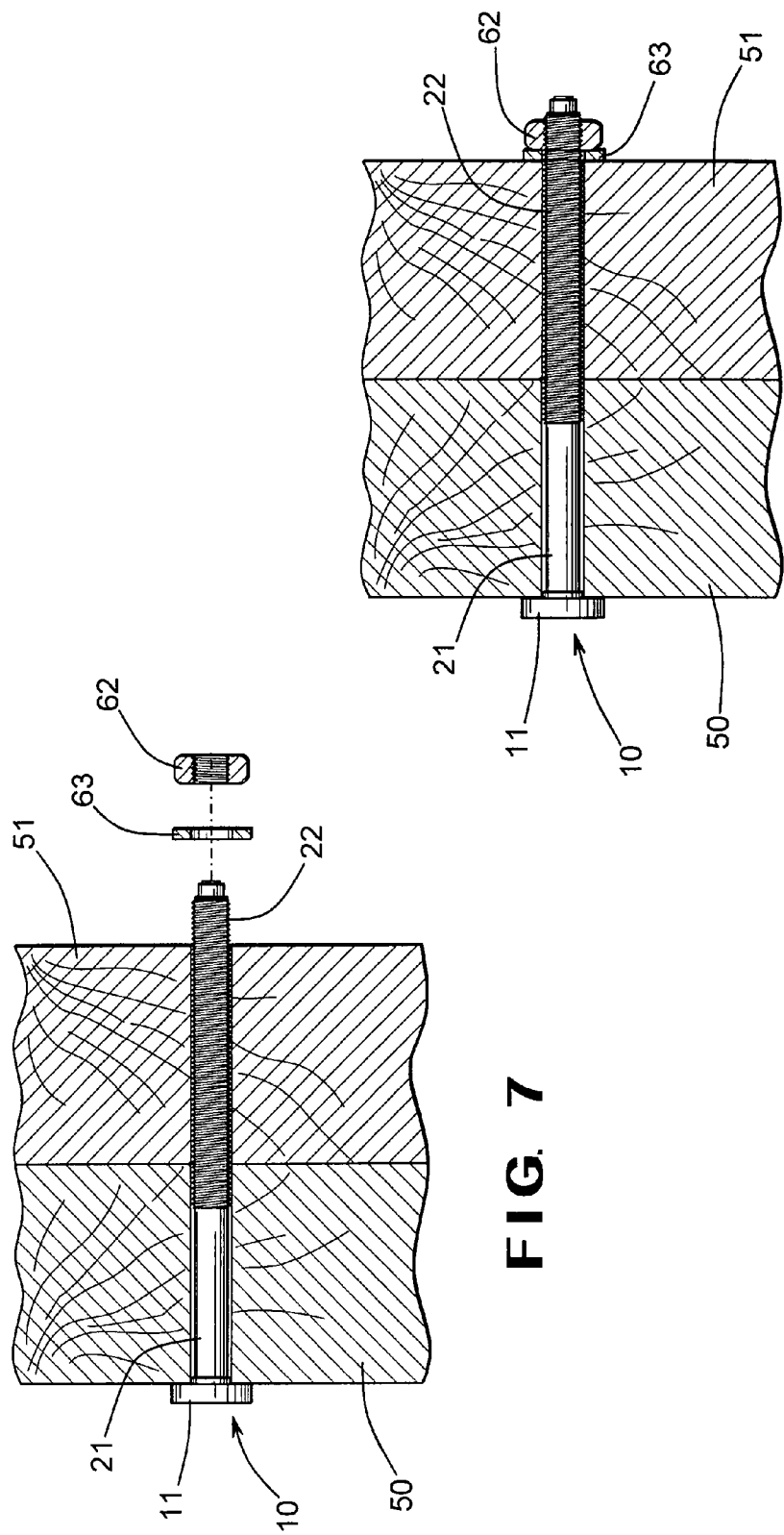

FASTENER FOR SECURING FIRST AND SECOND COMPONENTS TOGETHER AND METHOD OF USING SAME

CROSS-REFERENCE TO RELATED APPLICATIONS

This application is a continuation of International Application No. PCT/US05/35044 filed Sep. 29, 2005, which claims priority from U.S. Provisional Application Ser. No. 60/614,275, filed Sep. 29, 2004. The disclosures of both applications are incorporated herein by reference.

BACKGROUND OF THE INVENTION

This invention relates in general to fasteners for securing first and second components together. In particular, this invention relates to an improved structure for such a fastener that can be used to both initially drill a hole through first and second components, then subsequently secure the first and second components together after drilling. This invention also relates to a method of using such a fastener to secure the first and second components together.

In the construction of many structures, it is often necessary to secure first and second components together. For example, in conventional post frame construction techniques, which are often used in building a deck or similar structure, it is often necessary to support a horizontally extending beam on a vertically extending post. To accomplish this, it is known to initially support the beam on the post in a desired orientation relative thereto and to temporarily retain the beam and the post in this desired relative orientation. This temporary retainment is often accomplished by simply manually holding the first and second components in the desired relative orientation or by driving a nail through the beam and post while they are maintained in the desired relative orientation. Then, once the beam and the post have been temporarily retained in the desired relative orientation, aligned holes are formed through the beam and the post, such as by using a conventional drill. Following the formation of the aligned holes, the drill is withdrawn, and a permanent fastener, such as a threaded carriage bolt, is inserted therethrough. Lastly, a nut is threaded onto the end of the threaded carriage bolt to permanently retain the beam and the post in the desired relative orientation.

Although this method of construction has been effective, it has been found to be relatively time consuming and labor intensive. This is because the tool that is used to form the aligned holes through the first and second components must be removed and set down, then the fastener must be picked up, aligned with the drilled holes, and then inserted therethrough. Thus, it would be desirable to provide an improved fastener for securing first and second components together, and a method of using same, that is quicker and easier to use.

SUMMARY OF THE INVENTION

This invention relates to an improved structure for a fastener that can be used to both initially drill a hole through first and second components, then subsequently secure the first and second components together after drilling, as well to a method of using such a fastener. The fastener includes a head and a shank having a bolt portion and a drill portion. The fastener is initially rotated relative to the first and second components by an installation tool such that the drill portion drills a pair of aligned holes through the first and second components. Then, the drive portion of the fastener is removed from the bolt portion of the shank of the fastener, such as by using a removal tool. Lastly, a nut is installed on the bolt portion of the shank of the fastener.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a side elevational view of a fastener in accordance with this invention.

FIG. 1A is a sectional view taking along the arrowed line in FIG. 1 illustrating a first embodiment of a weakened region in accordance with this invention.

FIG. 1B is a sectional view taking along the arrowed line in FIG. 1 illustrating a second embodiment of a weakened region in accordance with this invention.

FIG. 2 is an end elevational view of a head of the fastener illustrated in FIG. 1.

FIG. 3 is a sectional elevational view of the fastener illustrated in FIGS. 1 and 2 shown in a first stage of use for securing first and second components together.

FIG. 4 is a sectional elevational view of the fastener illustrated in FIG. 3 shown in a second stage of use for securing the first and second components together.

FIG. 5 is a sectional elevational view of the fastener illustrated in FIG. 4 shown in a third stage of use for securing the first and second components together.

FIG. 6 is a sectional elevational view of the fastener illustrated in FIG. 5 shown in a fourth stage of use for securing the first and second components together.

FIG. 7 is a sectional elevational view of the fastener illustrated in FIG. 6 shown in a fifth stage of use for securing the first and second components together.

FIG. 8 is a sectional elevational view of the fastener illustrated in FIG. 7 shown in a sixth stage of use for securing the first and second components together.

DETAILED DESCRIPTION OF THE PREFERRED EMBODIMENT

Referring now to the drawings, there is illustrated in FIGS. 1 and 2 a fastener, indicated generally at 10, for securing first and second components (see FIGS. 3 through 8) together in accordance with this invention. The fastener 10 includes a head 11 that is, of itself, conventional in the art. The head 11 of the fastener 10 is provided to facilitate engagement of the fastener by an installation tool (see FIGS. 3 and 4) for rotatably driving the fastener 10 in order to secure the first and second components together in the manner described in detail below. To accomplish this, the illustrated head 11 includes a flat outer surface having a drive recess 11a provided therein. The illustrated drive recess 11a is a conventional six lobe internal drive recess, such as type T-40 drive recess, having a depth of about 0.100 inch or more. However, the head 11 may be formed having any desired shape and may be provided with any desired structure for facilitating the rotation thereof. The drive recess 11a is adapted to receive a similarly shaped end portion of the installation tool therein for facilitating the rotation of the fastener 10 during use.

The fastener 10 also includes a shank 12 that is generally elongated and cylindrical in shape. The shank 12 includes a bolt portion 20 that extends axially from the head 11. The shank 12 also includes a transition portion 30 that extends axially from the bolt portion 20. Lastly, the shank 12 includes a drill portion 40 that extends axially from the transition portion 30. In the illustrated embodiment, the head 11 and each of the portions 20, 30, and 40 of the shank 12 are formed from a single piece of metallic material, such as C-1022 or AISI type 300 steel. However, the head 11 and each of the portions 20, 30, and 40 of the shank 12 may be formed from any other desired material or group of materials and may be formed from separate pieces of such material or materials that are secured together.

The bolt portion 20 of the illustrated shank 12 includes a non-threaded portion 21 and a threaded portion 22. In the illustrated embodiment, the non-threaded portion 21 has an axial length of about 2.500 inches and a diameter of about 0.272 inch. However, the non-threaded portion 21 may have any desired length or diameter. Furthermore, the non-threaded portion 21 may be omitted completely such that the threaded portion 22 constitutes the entire axial length of the bolt portion 20. In the illustrated embodiment, the threaded portion 22 has a helical thread provided thereon, which preferably is a conventional 5/16-18 single lead thread. However, the threaded portion 22 may have any desired thread, group of threads, or other structure provided thereon. The illustrated threaded portion 22 has an axial length of about 3.000 inches and a major diameter (as defined by the outer edge of the helical thread) of about 0.311 inch, which is preferably slightly larger than the diameter of the non-threaded portion 21. However, the threaded portion 22 may have any desired length or diameter. The purpose of the bolt portion 20 will be explained below.

The transition portion 30 of the illustrated shank 12 extends between the bolt portion 20 and the drill portion 40 of the shank 12. In the illustrated embodiment, the transition portion 30 has an axial length of about 0.250 inch and a diameter of about 0.250 inch, which is preferably slightly smaller than both of the diameters of the non-threaded portion 21 and the threaded portion 22 of the bolt portion 20. However, the transition portion 30 may have any desired length or diameter. The transition portion 30 preferably has a weakened region 31 provided therein. In the embodiment illustrated in FIG. 1A, this weakened region 31 is an annular groove that extends completely about the circumference of the transition portion 30. However, the weakened region 31 may be embodied as any single or plurality of indentations or other features of the transition portion 30 that defines a region that is relatively weak in comparison to the other regions of the transition portion 30 or the other portions of the fastener 10. Additionally, the weakened region 31 may extend only partially about the circumference of the transition portion 30, and a plurality of such weakened regions (as shown at 31a in FIG. 1B) may extend about the circumference of the transition portion 30 in a discontinuous manner. Alternatively, the weakened region 31 may be defined by the transition region 30 itself. In other words, the weakened region 31 may be defined by whatever transition region 30 is provided between the bolt portion 20 and the drill portion 40 of the shank 12. If desired, the transition region 30 may be omitted, and the weakened region 31 may be defined merely as the junction between the bolt portion 20 and the drill portion 40 of the shank 12. The purpose of the transition portion 30 and the weakened region 31 will be explained below.

The drill portion 40 of the illustrated shank 12 extends axially from the transition portion 30 and has a drilling blade 41 provided thereon, which is preferably a conventional 20-9 type A bit point drilling blade. However, the drill portion 40 may have any desired drilling blade or group of drilling blades 41 provided thereon. The illustrated drilling blade 41 has an axial length of about 1.250 inch and a major diameter (as defined by the outer edge of the drilling blade 41) of about 0.330 inch, which is preferably slightly larger than the major diameter of the threaded portion 22 of the bolt portion 20. However, the drill blade 41 may have any desired length or diameter. The purpose of the drill portion 40 will be explained below.

The method of use of the above-described fastener 10 will now be described in connection with FIGS. 3 through 8. Initially, as shown in FIG. 3, first and second components 50 and 51 are provided. Although the fastener 10 of this invention will be described and illustrated in the context of connecting the first and second components 50 and 51 together, it will be appreciated that the fastener 10 can be used in connection with only a single component or with a greater number of components. The illustrated first and second components 50 and 51 may be embodied as any desired structures that can be connected together for any desired purpose. For example, the first and second components 50 and 51 may be first and second wooden members, such as a horizontally extending beam on a vertically extending post, that can be used to form portions of a wooden deck.

Initially, the first and second components 50 and 51 are disposed in a predetermined orientation relative to one another. Preferably, the first and second components 50 and 51 are disposed in abutment with one anther as shown in FIG. 3, although such is not required. While the first and second components 50 and 51 are maintained in the desired orientation relative to one another (either manually or using a temporary retainer, as described above), the fastener 10 is rotatably driven and moved into engagement with the first component 50. This can be accomplished, for example, using a conventional installation tool 60 that engages the drive recess 11a of the head 11 of the fastener 10 and rotatably drives the fastener 10 relative to the first and second components 50 and 51. The installation tool 60 may be embodied as any known apparatus for causing rotation of the fastener 10 relative to the first and second components 50 and 51.

As a result of such rotation, the drill portion 40 of the fastener 10 engages and drills through the first and second components 50 and 51 in a conventional manner, as shown in FIGS. 3 and 4. As the fastener 10 is rotatably driven into the first and second components 50 and 51, portions of the material of each of the first and second components 50 and 51 are displaced therefrom and removed by means of the drilling blade 41. Consequently, a pair of axially aligned holes 50a and 51a are respectively formed through the first and second components 50 and 51.

Once the drill portion 40 of the fastener 10 has drilled completely through the first and second components 50 and 51, the aligned holes 50a and 51a are formed completely through the first and second components 50 and 51. Thereafter, the installation tool 60 (or any other means) can be used to push the fastener 10 further through the aligned holes 50a and 51a of the first and second components 50 and 51 until the head 11 of the fastener 10 engages the outer surface of the first component 50, as shown in FIG. 4. This movement of the fastener 10 through the aligned holes 50a and 51a of the first and second components 50 and 51 can be done easily because, as mentioned above, the major diameter of the drilling blade 41 is slightly larger than the diameters of the threaded portion 22 of the bolt portion 20 and the remaining portions of the fastener 10, as mentioned above. Preferably, the overall axial length of the fastener 10 is such that when the head 11 of the fastener 10 engages the outer surface of the first component 50, a portion of the threaded portion 22 of the bolt portion 20 extends outwardly from the hole 51a formed through the second component 51, as shown also in FIG. 4.

Next, the drill portion 40 is removed from the fastener 10 in order to expose the threaded portion 22 of the bolt portion 20. To accomplish this, a removal tool 61 can be moved into engagement with a portion of the drill portion 40 of the fastener 10, as shown in FIG. 5. In the illustrated embodiment, the removal tool 61 is an elongated hollow member having an inner diameter that is slightly larger than the major diameter of the drilling blade 41. Thus, the removal tool 61 can be inserted easily about the drilling blade 41. Preferably, the removal tool 61 is oriented relative to the fastener 10 such that the leading end of the removal tool 61 is aligned with the weakened region 31 provided therein. However, the removal tool 61 may be oriented in any desired position relative to the fastener 10.

As discussed above, the illustrated weakened region 31 is an annular groove that extends completely about the circumference of the transition portion 30. The removal tool 61 is then moved at an angle relative to the axis of the fastener 10, in the manner of a second class lever. This can be accomplished by manually grasping the removal tool 61 and moving it as shown. In order to provide a better mechanical advantage, the axial length of the removal tool 61 is preferably somewhat longer than the axial length of the drill portion 40 of the fastener 10. This movement of the removal tool 61 causes the fastener 10 to fracture at the location of the weakened region 31, as shown in FIG. 6. As a result, us, the drill portion 40 can be quickly and easily removed from the fastener 10. It will be appreciated that the drill portion 40 can be removed from the fastener 10 using any other removal tool (such as a pair of pliers, for example) or manually by merely grasping and bending the drill portion 40 relative to the remainder of the fastener 10.

After the drill portion 40 of the fastener 10 has been removed, the threaded portion 22 of the bolt portion 20 is exposed. This allows a conventional nut 62 to be threaded onto the threaded portion 22 of the bolt portion 20, as shown in FIG. 7. If desired, a conventional washer 63 can be disposed about the threaded portion 22 of the bolt portion 20 before the nut 62 is threaded thereon. In either event, the nut 62 is tightened on the threaded portion 22 of the bolt portion 20 so as to securely connect the first and second components 50 and 51 together, as shown in FIG. 8.

Thus, it can be seen that the removable drill portion 40 provided on the fastener 10 allows a single fastener 10 to both (1) drill the aligned holes 50a and 51a through the first and second components 50 and 51 and (2) function as the main portion of the retainer for connecting the first and second components 50 and 51 together (together with the nut 62). This eliminates the need for pre-drilling of the first and second components 50 and 51 by a separate drilling tool in order to insert a conventional bolt therethrough, thus saving a significant amount of time and effort.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:
1. A one-piece fastener comprising:
a head; and
a shank extending from the head, the shank including a bolt portion, a transition portion extending from the bolt portion and having a weakened region provided therein that is spaced from the bolt portion, and a drill portion extending from the transition portion, the drill portion defining an outer diameter that is larger than an outer diameter defined by the bolt portion, wherein the head and the shank are formed from a single piece of material.

2. The fastener defined in claim 1 wherein the bolt portion includes a non-threaded portion extending from the head and a threaded portion extending from the non-threaded portion to the transition portion.

3. The fastener defined in claim 1 wherein the weakened region is a groove.

4. The fastener defined in claim 1 wherein the weakened region is an indentation.

5. The fastener defined in claim 1 wherein the weakened region extends completely about the transition portion.

6. The fastener defined in claim 1 wherein the weakened region extends only partially about the transition portion.

7. The fastener defined in claim 1 wherein the drill portion includes a helical drill blade.

8. The fastener defined in claim 7 wherein the drill portion further includes a tapered portion defining a point, and wherein the helical drill blade extends along the tapered portion.

9. The fastener defined in claim 7 wherein said helical drill blade extends along the entire length of said drill portion.

10. The fastener defined in claim 7 wherein the drill portion is adapted to both drill and advance the fastener into a component.

11. The fastener defined in claim 1 wherein the bolt portion includes a threaded portion and the transition portion includes a non-threaded portion that extends from the threaded portion.

12. The fastener defined in claim 1 wherein the transition portion defines a cross-sectional size that is smaller than a cross-sectional size of the bolt portion.

13. The fastener defined in claim 1 wherein the bolt portion includes a threaded portion and the transition portion includes a non-threaded portion that extends from the threaded portion, and wherein the transition portion defines a cross-sectional size that is smaller than a cross-sectional size of the bolt portion.

14. A one-piece fastener comprising:
a head; and
a shank extending from the head, the shank including a bolt portion having a helical bolt thread with a first helix angle, a drill portion having a helical drill blade with a second helix angle defining an outer diameter that is larger than an outer diameter defined by the bolt thread, and a transition portion located intermediate the bolt portion and the drill portion, wherein a weakened region is provided within the transition portion at a location that is spaced apart from the bolt portion, and wherein the head and the shank are formed from a single piece of material.

15. The fastener defined in claim 14 wherein the transition portion includes a non-threaded portion that extends from the helical bolt thread.

16. The fastener defined in claim 14 wherein the transition portion defines a cross-sectional size that is smaller than a cross-sectional size of the bolt portion.

17. The fastener defined in claim 14 wherein the transition portion includes a non-threaded portion that extends from the helical bolt thread, and wherein the transition portion defines a cross-sectional size that is smaller than a cross-sectional size of the bolt portion.

* * * * *